April 27, 1943.  K. RICHTER  2,317,805

CURRENT REGULATING RESISTANCE

Filed Nov. 2, 1940

INVENTOR
KURT RICHTER
BY
ATTORNEY

Patented Apr. 27, 1943

2,317,805

UNITED STATES PATENT OFFICE 2,317,805

CURRENT REGULATING RESISTANCE

Kurt Richter, Berlin, Germany; vested in the Alien Property Custodian

Application November 2, 1940, Serial No. 364,047 In Germany September 8, 1939

3 Claims. (Cl. 201—63)

This invention relates to a resistance adapted to the automatic regulation of the intensity of the current flowing therethrough to a constant and stable value.

To stabilize the current supplied from a variable-potential source of current it has heretofore been customary to use an iron-hydrogen resistance. The latter consists of a mostly spiraled iron wire confined inside an atmosphere of hydrogen at reduced pressure. If such an iron wire which is of comparatively reduced diameter and of rather great length, were confined inside a high vacuum rather than an atmosphere of hydrogen, it would be entirely deprived of its regulating ability. If an iron-hydrogen resistance is to be used for regulating the heating or filament current of a high-vacuum tube comprising a hot cathode, it is necessary to place the iron wire inside a special vacuum-tight vessel filled with hydrogen. To mount the regulating resistance inside the high-vacuum tube to be regulated is only possible by providing inside the high-vacuum space of the tube or in the base thereof a distinct container for the said iron-hydrogen resistance. Now, the invention is predicated upon the discovery of the fact that, under certain operating conditions, it is feasible to obtain regulating properties also with an iron wire which is confined inside a high vacuum.

According to the invention a resistance adapted to regulate and control the strength of the current flowing through the same at a fixed value consists of a wire or ribbon of iron accommodated inside a highly evacuated space on which local cooling points are provided between the ends. The chilling effect may be produced either by heat-conducting supports or else by fitting radiator bodies thereon.

The intensity of the current to be regulated, in the object of the present invention and its embodiment, is a function not only of the wire diameter, but also of the distance between the cooling points provided between the ends thereof, in such a way that the stabilized current intensity rises as the distances between the chilling points are reduced. In fact, for each current strength there exists a maximum admissible inter-cooling point distance for which the regulability is optimal. Upon further increase of the distances the regulator effect decreases rapidly. It is readily feasible to ascertain experimentally the distances and conductor cross-sections required for a definite case.

In comparison with an iron-hydrogen resistance which is proportioned for the same current strength there results, for the object of this invention and its embodiment, a larger wire diameter and a shorter wire. This circumstance also explains why for the iron-hydrogen resistance supporting of the iron wire is practically without any effect upon the current-voltage characteristic, that is, because the lengths of wire between the supports are essentially greater here and because the heat abduction through the supporting means is immaterial.

Figure 1:
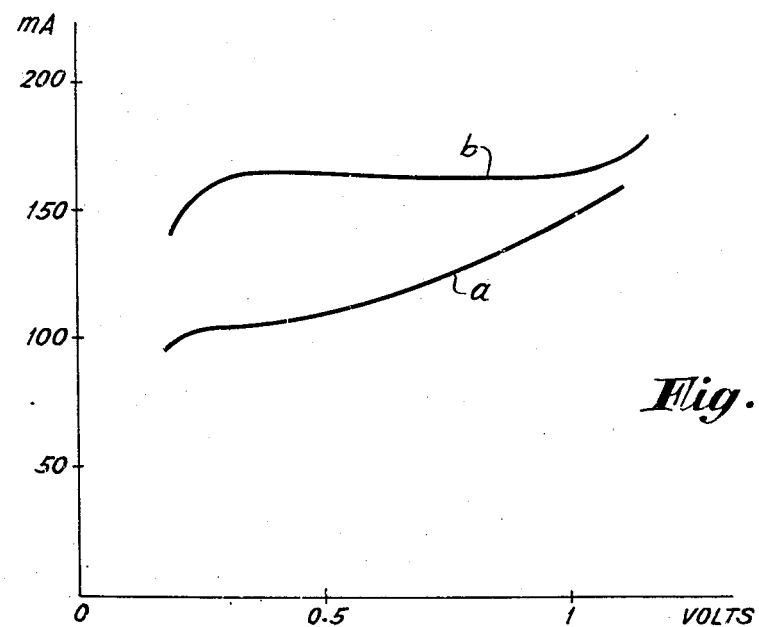
Figure 1 is a curve sheet used to explain certain features of the invention.

The effect to be obtained with the object of the invention can best be illustrated, for instance, by the following comparative tests:

Two iron wires of each 16 mm. length and .045 mm. diameter are stretched out inside a high-vacuum space and attached at their ends in supporting or anchor wires which are sealed in a squash. One of the two wires is connected in the middle with another support so as to permit heat to be carried off. This wire is thus divided into two halves each of 8 mm. length. Further supporting consists also of a supporting wire sealed in the squash. The current-voltage characteristic of the non-subdivided iron wire is illustrated by the graph $a$, Fig. 1. It will be noticed that the temperature dependence of the iron resistance is by far insufficient for the stabilization of the current flowing therethrough. However, with the subdivided wire there results the curve $b$, Fig. 1 which exhibits a pronounced and evident regulating range in which the current strength is stable.

The various wire portions may be made of different lengths and cross-sectional areas, in fact, in this manner the shape of the regulating curve can be influenced. It is also possible to bring the supports between the ends of the wire out of the vacuous vessel, it being thus feasible to connect the various wire portions in any desired way either in parallel or in series. This affords a further change to influence the regulating curve.

Figure 2:
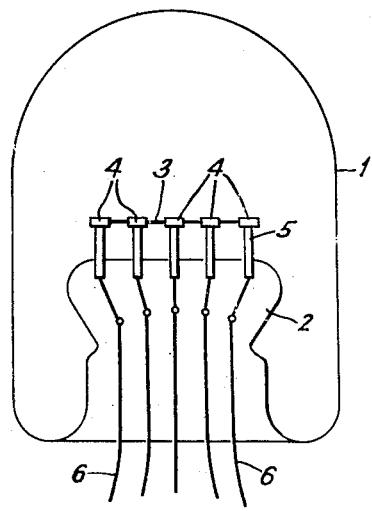
Figure 2 illustrates in diagrammatic form an embodiment of the invention wherein conducting leads are shown between intermediate points of the resistance wire; and, Figure 3 illustrates another embodiment of the invention wherein discs are used as heat radiators.

Fig. 2 illustrates an exemplified embodiment in schematic form. Referring to Fig. 2, a highly evacuated vessel 1 is provided with a press or squash 2 in which is lodged an iron wire or band 3. Apart from its being supported at both ends, the iron wire or band 3 is secured also at three intermediate points by the aid of clips 4 and supporting wires 5, the latter, in turn, being sealed in the squash 2. By way of the clips heat is carried away from the iron wire to the squash, and this results in the current control effect before described. In the simplest instance current supply leads 6 are connected only to the two ends of the iron wire. However, in order to be able to vary the regulator actions of the iron wire, it will be found expedient to connect leads also to the supports between the ends so that it is possible to provide different combinations in series and parallel of the various wire portions.

Figure 3:
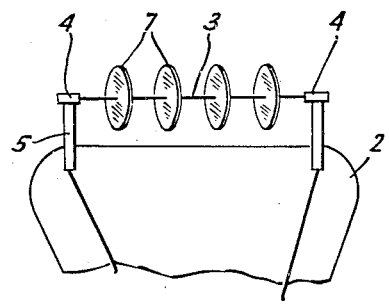

Fig. 3 shows a further exemplified embodiment of the object of this invention. In this case the iron wire 3 is secured only at the two ends by the aid of the clips 4 to the supporting means 5 sealed in the squash 2. At points intermediate between the wire ends are radiator surfaces 7 in the form of small metal disks shifted onto the iron wire. The radiator surfaces act in the very same way as the intermediate supports in the case of Fig. 2, that is, they produce local chilling of the iron wire and thus a shape of the current-voltage characteristic such as illustrated by graph b, Fig. 1.

It will be readily understood that a resistance according to the invention may be built readily into the same vacuous vesel a the discharge tube to be regulated. However, even in a case where the regulator resistance is to be produced as an independent unit, the object of this invention offers certain practical advantages for the reason that the hydrogen atmosphere is made dispensable.

I claim:

1. In a resistance device adapted to automatically control the intensity of current flowing therethrough so as to stabilize the current to a substantially fixed value, an iron wire supported within an exhausted envelope, a plurality of heat dissipating means mounted on said wire at spaced intervals between its ends, a support provided for at least one of the heat dissipating means, and a lead-in conductor connected to each support.

2. A resistance device as claimed in claim 1 characterized by that said wire comprises a plurality of sections of resistance wire, each section being bounded by heat dissipating means and conducting leads from each of said sections.

3. In a resistance device, an exhausted envelope provided with a press, a resistance wire mounted within said envelope by supporting means embedded in said press, heat dissipating means mounted on said wire, said heat dissipating means also being embedded in said press and acting as an additional support for said wire.

KURT RICHTER.